United States Patent [19]
Riddles et al.

[11] Patent Number: 5,464,257
[45] Date of Patent: Nov. 7, 1995

[54] COUPLING FOR JOINING PIPE FITTINGS HAVING OFFSET LUG RESTRAINTS

[75] Inventors: Gordon S. Riddles, Madison Heights; Jerry O. Burke, Lynchburg, both of Va.

[73] Assignee: The Harrington Corporation, Lynchburg, Va.

[21] Appl. No.: 331,812

[22] Filed: Oct. 31, 1994

[51] Int. Cl.⁶ .................................................. F16L 41/00
[52] U.S. Cl. .......................... 285/156; 285/305; 285/320
[58] Field of Search ....................................... 285/305, 320, 285/370, 420, 156

[56] References Cited

U.S. PATENT DOCUMENTS

| | | | |
|---|---|---|---|
| 180,781 | 8/1876 | Morgan | 285/420 X |
| 372,568 | 11/1887 | Riley | 285/305 X |
| 1,200,360 | 10/1916 | Johnson | 285/420 X |
| 1,985,899 | 1/1935 | Jahn | 285/420 X |
| 2,126,505 | 8/1938 | Risser | 285/420 X |
| 5,090,743 | 2/1992 | Obering | 285/156 |

FOREIGN PATENT DOCUMENTS

| | | | |
|---|---|---|---|
| 2000240 | 1/1979 | United Kingdom | 285/370 |

*Primary Examiner*—Dave W. Arola
*Attorney, Agent, or Firm*—Nixon & Vanderhye

[57] ABSTRACT

A pipe fitting coupling has a generally ring-shaped body with two pairs of diametrically opposed radially outwardly projecting lugs spaced 90° one from the other. The coupling is interposed between the bells of pipe fittings to be joined, with each bell having only a pair of misaligned diametrically opposed lugs. The lugs on the coupling align with the misaligned lugs of the pipe fittings and restraints are disposed about the aligned lugs to secure the pipe fittings to one another.

12 Claims, 3 Drawing Sheets

5,464,257

COUPLING FOR JOINING PIPE FITTINGS HAVING OFFSET LUG RESTRAINTS

TECHNICAL FIELD

The present invention relates to a pipe coupling, and particularly relates to a coupling for joining cast iron pipe fittings to one another wherein the fittings have offset lug restraints at their juncture.

BACKGROUND

Many and various types of fluid conduits and pipe fittings for those conduits have been used in the past. In U.S. Pat. No. 5,183,298, of common assignee herewith, there are illustrated fittings for a fluid system wherein reducer fittings are employed with main fittings for reducing the flow in branch fluid flow conduits. In that patent, there is also illustrated a coupling system for securing the fittings to one another. More specifically, in that patent, a tee fitting is provided, with axially opposite end bells and a laterally directed bell, each bell having a pair of radially outwardly projecting, diametrically opposite, tabs or lugs. The reducer fitting to be joined to the tee similarly has a pair of radially outwardly projecting, diametrically opposed, tabs or lugs. When the reducer fitting is aligned with a bell on the tee, the lugs of the fittings are axially aligned with one another. Securing devices, such as a metal wrapping rings or straps, are applied to the registering lugs to secure the fittings to one another. These lugs and restraining rings are heavy-duty and designed to withstand thousands of pounds of pull per lug. Typically, on pipe fittings such as tees, reducers, bends and adapters, the lugs are cast on the fittings on opposite sides of the horizontal centerline of the flow passage through the fittings and only a pair of such lugs are provided each bell.

In many installations, it is often desirable to provide laterally directed fluid lines relative to a pair of generally parallel, horizontally extending, fluid lines. It will be appreciated that a fitting, such as a tee, may simply be installed so that its laterally directed opening (bell) extends to the desired side. However, where a second fluid line requires a lateral to extend to the same side as the first fluid line, the second tee cannot be installed to direct its lateral opening (bell) toward that one lateral side because the connection or the lateral pipe to the second tee would interfere with the other line. Thus, to direct laterals from a pair of parallel, generally horizontal pipe lines, the more remote pipe line must locate its lateral above or below the adjacent pipe line.

Various types of fittings have been provided for this purpose and involve a multiplicity of connections between a main line and a lateral line in order to locate the lateral above or below the main line. A number of different pipe connection assemblies have been required to effect that transition. These assemblies, however, not only require a substantial number of different parts but also extensive labor, resulting disadvantageously in prolonged installation. Further, when employing the system of restraining lugs disclosed in the above-identified patent, all of the lugs of the fittings, for example, tees and bends, are aligned in a plane containing the openings and the flow centerlines. Consequently, if a 90° bend fitting is to be joined with a tee to produce a connection between a first line and a lateral at a different elevation, the lugs on the bell of the bend and the bell of the lateral of the tee are misaligned. More particularly, such lugs are misaligned by 90° and the desired connection cannot be effected using the restraints and aligned lugs as set forth in that prior U.S. Pat. No. 5,183,298. Thus, it has been found desirable to provide a pipe coupling which will facilitate the connection between a main line and a lateral line using a lug and restraint system, as exemplified in U.S. Pat. No. 5,183,298, for joining pipe lines at different elevations relative to one another.

DISCLOSURE OF THE INVENTION

According to the present invention, there is provided a coupling for facilitating connection between a first fluid conduit and a second lateral conduit wherein the conduits are at different elevations and extend in non-parallel directions and wherein the lug and restraint system of U.S. Pat. No. 5,183,298 may be employed directly to effect that connection. Particularly, there is provided a coupling comprised of a generally ring-shaped member having two pairs of lugs or tabs projecting radially outwardly of the member. The lugs of one pair thereof lie diametrically opposite to one another, while the lugs of the other pair thereof similarly lie diametrically opposite to one another. The pairs of lugs, however, are located at different angular positions relative to one another. For example, the pairs of lugs may be located 90° apart. In a preferred embodiment hereof, the lugs of one pair are spaced axially from the lugs of the opposite pair. The lugs are preferably configured to facilitate use of the restraints as illustrated in U.S. Pat. No. 5,183,298 and are therefore notched on one side.

The coupling may be used, for example, to join a tee and a bend such that the first fluid line, e.g., containing the tee fitting, may lie at a different elevation and at a different angle relative to a lateral line coupled to the bend. To accomplish this, the tee, for example, has a laterally directed bell with radially projecting lugs aligned in a plane containing the flow centerline through the tee between its opposite ends. The bend has bells at its opposite ends and at least one bell has a pair of radially outwardly projecting, diametrically opposed, lugs lying in a plane also containing the centerline of the flow through that bell. With this typical configuration of the lugs on the bells, it will be appreciated that the registration of the bell at one end of the bend with the lateral bell of the tee to accomplish a lateral connection in a different direction and at a different elevation than the flow through the first line causes the lugs on the bells of the bend and lateral of the tee to be misaligned. For example, if the flow lines are 90° relative to one another, the lugs extant on the bells of the tee and bend are offset from one another by 90°.

To effect that connection between the tee and the bend, notwithstanding the misaligned lugs on their registering bells, the coupling of the present invention is interposed between these bells and the pipe fittings are secured to another by and through the coupling using the lug restraint system. Particularly, the coupling is aligned such that a pair of its lugs registers with the lugs on the lateral bell of the tee and another pair of lugs register with the lugs on the registering bell of the bend. Consequently, the coupling accommodates the offset of the lugs on the tee and bend (in this case, a 90° offset) and enables securement of the bend to the coupling and the lateral to the coupling using the lug restraint system. Preferably, in assembling the joint, a short pipe section, for example, a PVC section, is disposed within the bells of the registering bend and lateral of the tee with the coupling first being disposed about the pipe section to lie between its ends and between the registering bells of the tee and bend. The bells are gasketed to prevent leakage. Thus, by providing a coupling accommodating the offset of the lugs of typical pipe fitting tees, bends and the like, a pipe joint enabling connection between a first line and a second lateral line at different elevations and extending in different directions may be readily effected with a minimum of parts and installation time. It will also be appreciated that pipe couplings at angles other than a 90° angle between the fluid lines may be effected. For example, if the two fluid lines extend 45° relative to one another, the lugs on the coupling may be formed, e.g., cast, to provide pairs of lugs spaced 45° from one another to accommodate the particular angle of the fluid lines relative to one another.

In a preferred embodiment according to the present invention, there is provided a pipe coupling system for fluid lines comprising a first pipe fitting having a central body defining a fluid flow path with first and second axially opposite ends having openings and a third laterally directed opening between the end openings and in communication with the fluid flow path, a first pair of radially outwardly projecting diametrically opposed lugs about the third opening, the openings and the lugs being aligned in a plane passing through the first, second and third openings, a second pipe fitting having a central body defining a flow path between end openings thereof and having a bend between the end openings, a second pair of radially outwardly projecting, diametrically opposed, circumferentially spaced lugs about one of the opposite end openings of the second pipe fitting, the opposite end openings, the flow path and the lugs of the second pipe fitting lying in a plane. A generally ring-shaped coupling is provided for joining the first and second pipe fittings to one another with the third opening of the first pipe fitting and the one of the opposite end openings in fluid communication with one another, the first and second pipe fittings being oriented with the planes thereof lying non-parallel to one another and with the first and second pairs of lugs being misaligned with one another, the coupling having a third pair of lugs spaced from one another for alignment with the first pair of lugs about the third opening and a fourth pair of lugs spaced from one another for alignment with the second pair of lugs about the one end opening and retaining devices for securing the third pair of lugs of the coupling aligned with the first pair of lugs about the third opening to one another and for securing the fourth pair of lugs of the coupling aligned with the second pair of lugs about the one opening to one another, thereby securing the first and second pipe fittings to one another.

In a further preferred embodiment according to the present invention, there is provided a pipe joint for coupling two pipe fittings to one another comprising a first pipe fitting having a bell defining an opening and a first pair of radially outwardly projecting lugs spaced from one another about the bell, a second pipe fitting having a bell defining an opening and a second pair of radially outwardly projecting lugs spaced from one another about the bell, the bells of the first and second pipe fittings being disposed in registration with one another, with the pairs of lugs thereof, respectively, misaligned with one another, a generally ring-shaped coupling for joining the bells to one another and having third and fourth pairs of lugs with the lugs of each pair thereof spaced circumferentially from one another, respectively, the first and third pairs of lugs being aligned with one another and the second and fourth pairs of lugs being aligned with one another and retaining devices for securing the aligned lugs of the coupling and the bells to one another, thereby securing the first and second pipe fittings to one another.

In a still further preferred embodiment according to the present invention, there is provided a coupling for joining two pipe fittings to one another wherein the two fittings have bells, each with pairs of diametrically opposite lugs projecting radially outwardly of the bells, the coupler comprising a generally ring-shaped member for joining the bells to one another and having two pairs of lugs, the lugs of one of the pairs thereof being diametrically opposed to one another and the lugs of another of the pair thereof being diametrically opposed to one another, the lugs being spaced about the ring-shaped member from one another and the lugs of each pair thereof being shaped to facilitate securement thereof to respective registering lugs on the bells.

Accordingly, it is a primary object of the present invention to provide a novel and improved pipe coupling for joining pipe fittings to enable a fluid connection between a first line and a second lateral line extending at a different elevation and in a different direction as compared with the first line using a lug restraint system as part of the connection.

BEST MODE FOR CARRYING OUT THE INVENTION

Figure 1:
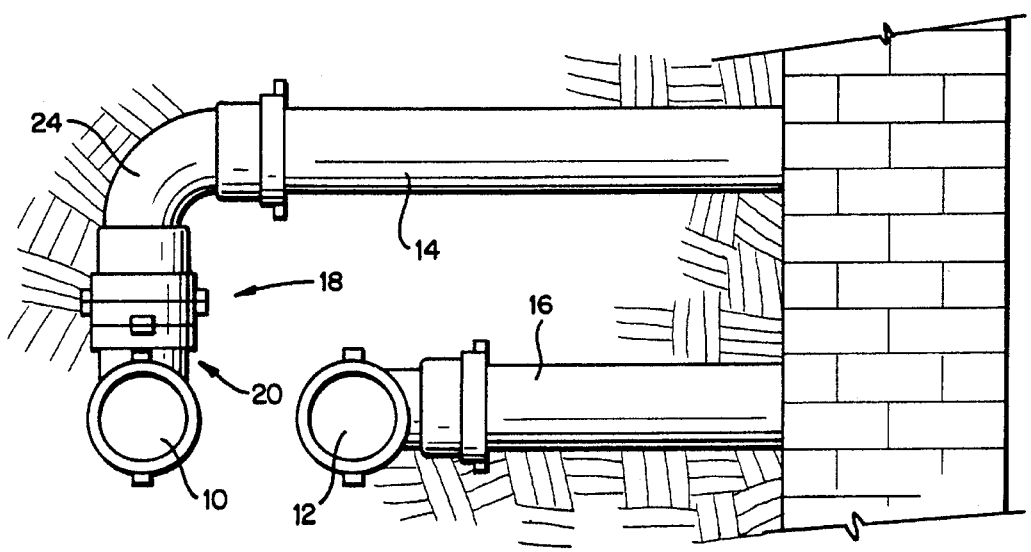
FIG. 1 is an elevational view illustrating a pair of parallel pipe lines having connections for flowing fluid through laterals at different elevations and, different directions from the pair of main lines.

Referring to FIG. 1, there is illustrated a pair of fluid lines 10 and 12 extending in side-by-side relation relative to one another and in a common horizontal plane. Additionally, laterals 14 and 16 are coupled to the pipe lines 10 and 12, respectively, for flowing fluid from the lines 10 and 12 to one side thereof. It will be appreciated from a review of FIG. 1, that it is necessary to dispose a lateral of one pipe line above or below the other pipe line in order to provide laterals from both pipe lines 10 and 12. As illustrated with respect to the line 12, a lateral connection can be made by disposing a tee fitting such that the lateral opening of the tee is directed to the desired side of the line 12. The lateral pipe 16 can then be disposed in the laterally oriented bell of the tee. However, because lateral 14 would interfere with the line 12 and lateral 16 if the tee of the line 10 was similarly disposed on its side to effect the lateral connection, a different type of pipe coupling is required.

In this representative example of the present invention, the pipe coupling 18 of the present invention may be comprised of a tee fitting, generally designated 20, a coupling 22 and a bend 24. It will be appreciated that other fittings may be joined to one another than a tee and a bend in accordance with the present invention and that while a 90° bend is illustrated, other bends of varying degrees may be used. Further, it will be appreciated that while the pipe coupling hereof is illustrated with respect to a laterally directed bell of a tee, it may likewise be used with the bells at either end of a tee or of other fittings.

Figure 2:
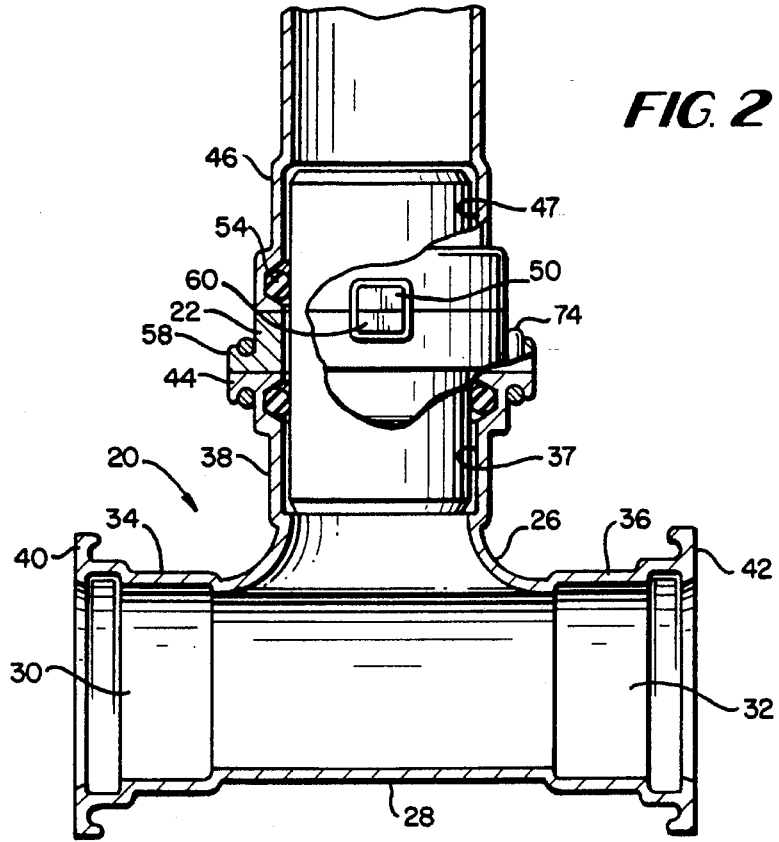
FIG. 2 is an enlarged cross-sectional view with portions thereof in elevation illustrating a pipe connection according to the present invention.
Figure 3:
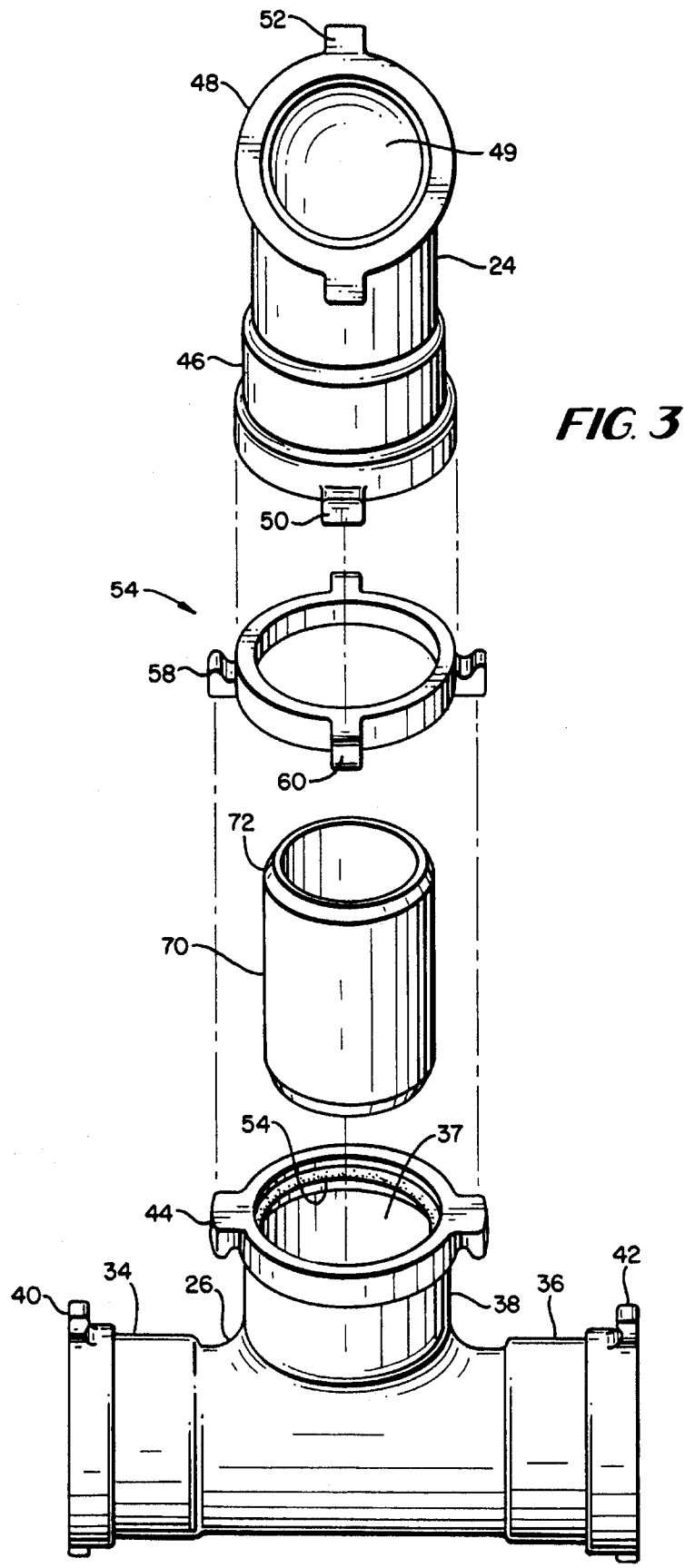
FIG. 3 is an exploded perspective view of the pipe connection of FIG. 2.

With respect to FIGS. 2 and 3, there is illustrated a tee fitting 20, preferably comprising a pipe fitting formed of cast ductile iron. Fitting 20 includes a central straight-through pipe body 28 having opposite end openings 30 and 32, defined by bells 34 and 36, respectively. Additionally, a lateral opening 37 defined by a bell 38 is disposed to one side of body 28 and lies in communication with the fluid flow path through the body 28. Thus, each bell 34, 36 and 38 defines an opening for communicating fluid. Additionally, as disclosed in prior U.S. Pat. No. 5,183,298, tabs or lugs 40 and 42 are typically disposed at opposite ends of the bells 34 and 36, respectively. The lugs 40 and 42 project radially outwardly of the bells at diametrically opposite locations about the bells. Additionally, a first pair of lugs 44 project radially outwardly of the bell 38 defining lateral opening 37. From a review particularly of FIG. 3, it will be appreciated that the lugs 40, 42 and 44 of the tee, as well as the bells and the centerlines of the openings defined by the bells, lie in a common plane extending through the tee fitting 20.

Referring to FIG. 3, the bend 34 includes bells 46 and 48 at its opposite ends defining openings 47 and 49, respectively. Each bell 46 and 48 has a pair of radially outwardly projecting lugs 50 and 52, respectively. From a review of FIG. 3, it will be appreciated that the lugs 50 and 52, the bells 46 and 48, as well as the centerline of the flow path through the bend 24 and the openings through the bells 46 and 48, lie in a common plane. It will also be appreciated that each of the bells, for example, as illustrated in FIGS. 2 and 3, has an extended axial section having a groove for receiving a gasket. For example, a gasket 54 is illustrated in bell 38 in FIG. 3.

Figure 4:
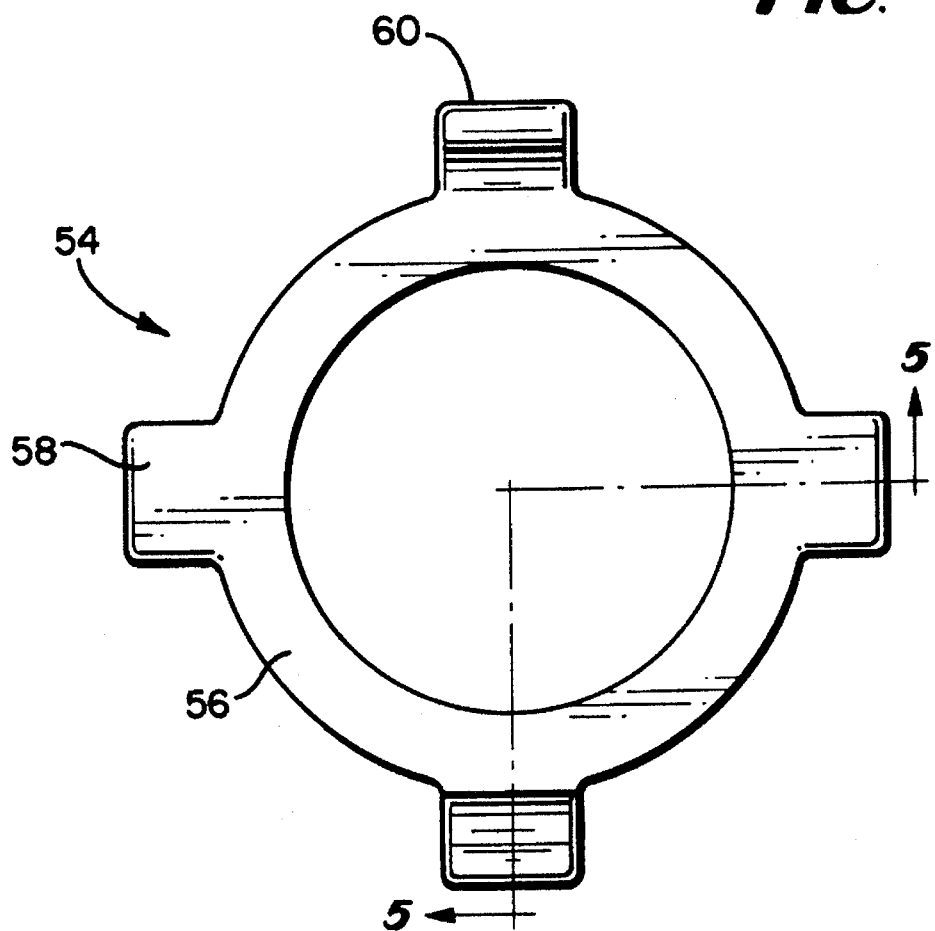
FIG. 4 is an elevational view of a pipe coupling for use in the pipe connection according to the present invention.
Figure 5:
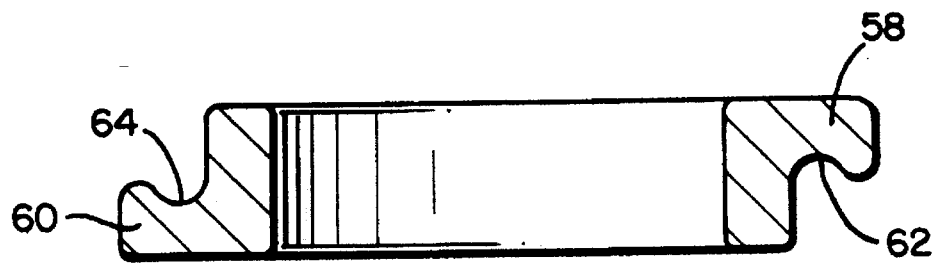
FIG. 5 is a cross-sectional view thereof taken generally about on line 5—5 in FIG. 4.

In accordance with the present invention, the connection between line 10 and lateral 14, particularly between tee 20 and bend 24, is facilitated by the use of a coupling, generally designated 54. Coupling 54, as best illustrated in FIGS. 4 and 5, comprises a generally ring-shaped member 56 having a third pair of generally radially outwardly projecting lugs 58 at diametrically opposite positions relative to one another and a fourth pair of lugs 60 projecting radially outwardly at diametrical opposed positions relative to one another. The third and fourth pairs of lugs 58 and 60 are arranged substantially at 90° relative to one another as illustrated, although it will be appreciated that the paris of lugs can be disposed at angles other than 90° to one another. Further, while other types of restraints, e.g., bolts, can be used to connect the coupling 54 with fittings 26 and 24, the lugs of the third and fourth pairs thereof are preferably notched at 62 and 64 to facilitate use with wire or ring restraints. It will also be seen from a review of FIG. 5 that the pairs of lugs of coupling 54 are axially spaced from one another. Thus, the notches 62 and 64 of the lugs of each pair of lugs face the notches of the opposite pair of lugs in an axial direction.

To effect the joint of the present invention, a short section of pipe, for example, pipe section 70 formed of a plastic material such as PVC or steel, is provided for reception in the bells of the adjoining pipe fittings 20 and 24. The opposite ends of pipe section 70 are preferably bevelled at 72. The pipe section 70 may then be disposed in one of the bells, with the tapered or bevelled end 72 facilitating its insertion past the gasket 54 of the bell. When pipe section 70 is inserted into one bell, the coupling 54 may be disposed about the pipe section. The other fitting, in this instance, bend 24, may then be disposed about the opposite end of pipe section 70. Thus, it will be appreciated that the coupling 54 is interposed between the registering bells 38 and 46 of the fittings 20 and 24, respectively. The coupling 54 may be rotated to align the third and fourth pairs of lugs 58 and 60, respectively, with the first and second pairs of lugs 44 and 50, respectively, of the tee 20 and bend 24. When aligned, restraining rings or restraints 74 (FIG. 2) are disposed about the aligned lugs, particularly in the notches of the aligned lugs, to facilitate connection of those lugs to one another. It will be appreciated that when connected, the coupling 54 is thus rigidly connected to both of tee 20 and bend 24 whereby the tee and bend are secured one to the other.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pipe coupling system for fluid lines comprising:

a first pipe fitting having a central body defining a fluid flow path with first and second axially opposite ends having openings and a third laterally directed opening between said end openings and in communication with the fluid flow path;

a first pair of radially outwardly projecting diametrically opposed lugs about said third opening, said openings and said lugs being aligned in a plane passing through the first, second and third openings;

a second pipe fitting having a central body defining a flow path between end openings thereof and having a bend between said end openings;

a second pair of radially outwardly projecting, diametrically opposed, circumferentially spaced lugs about one of the opposite end openings of said second pipe fitting, said opposite end openings, said flow path and said lugs of said second pipe fitting lying in a plane;

a generally ring-shaped coupling for joining said first and second pipe fittings to one another with said third opening of said first pipe fitting and said one of said opposite end openings in fluid communication with one another, said first and second pipe fittings being oriented with the planes thereof lying non-parallel to one another and with said first and second pairs of lugs being misaligned with one another;

said coupling having a third pair of lugs spaced from one another for alignment with the first pair of lugs about said third opening and a fourth pair of lugs spaced from one another for alignment with the second pair of lugs about said one end opening; and first retaining devices for securing the aligned first and third pair of lugs of said coupling to one another and second retaining devices for securing the aligned second and fourth pairs of lugs of said coupling to one another, thereby securing said first and second pipe fittings to one another.

2. A pipe coupling system according to claim 1 wherein the lugs on said coupling are notched on sides thereof opposite the lug to which it is secured.

3. A pipe coupling system according to claim 1 wherein said third and fourth pairs of lugs on said coupling are axially spaced from one another.

4. A pipe coupling system according to claim 3 wherein each of the third and fourth pairs of lugs of said coupling are notched on sides thereof facing the lugs of another of said axially spaced third and fourth pairs thereof.

5. A pipe coupling system according to claim 1 including a short pipe section disposed within said registering lateral opening of said first pipe fitting and said one end opening of said second pipe fitting.

6. A pipe joint for coupling two pipe fittings to one another comprising:

a first pipe fitting having a bell defining an opening and a first pair of radially outwardly projecting lugs spaced from one another about said bell;

a second pipe fitting having a bell defining an opening and a second pair of radially outwardly projecting lugs spaced from one another about said bell;

said bells of said first and second pipe fittings being disposed in registration with one another, with said pairs of lugs thereof, respectively, misaligned with one another;

a generally ring-shaped coupling for joining said bells to one another and disposed between said registering bells with said bells engaging said coupling on opposite sides thereof, said coupling having third and fourth pairs of lugs with the lugs of each pair thereof spaced circumferentially from one another, respectively, said first and third pairs of lugs being aligned with one another and said second and fourth pairs of lugs being aligned with one another; and retaining devices for securing the aligned lugs of the coupling and said bells to one another, thereby securing said first and second pipe fittings to one another with said coupling therebetween.

7. A pipe joint according to claim 6 wherein the lugs on said coupling are notched on sides thereof opposite the lug to which they are secured.

8. A pipe joint according to claim 6 wherein said third and fourth pairs of lugs on said coupling are axially spaced from one another.

9. A pipe joint according to claim 6 wherein each of the third and fourth pairs of lugs of said coupling are notched on sides thereof facing the lugs of another of said axially spaced third and fourth pairs thereof.

10. A pipe joint according to claim 6 including a short pipe section disposed in said registering bells, said coupling being disposed about said pipe section.

11. A coupling for joining two pipe fittings to one another wherein the two fittings have bells, each with pairs of diametrically opposite lugs projecting radially outwardly of the bells, said coupling comprising:

a generally ring-shaped member for joining the bells to one another and having two pairs of lugs;

the lugs of one of said pairs thereof being diametrically opposed to one another and the lugs of another of said pair thereof being diametrically opposed to one another;

the lugs being spaced about said ring-shaped member from one another;

said pairs of lugs on said coupling being axially spaced from one another;

said lugs of each pair thereof being notched along sides thereof facing the axially spaced pair of lugs; and said lugs of each pair thereof being shaped and located about said member to facilitate securement thereof to respective registering lugs on said bells.

12. A coupling according to claim 11 wherein the pairs of lugs are spaced about said ring-shaped member at about 90° relative to one another.

* * * * *